Nov. 26, 1968  W. D. DRUMMOND  3,412,536
AUGER PLATFORM WINDROWER
Original Filed Nov. 24, 1964  6 Sheets-Sheet 1

INVENTOR.
William Drummond
BY
John J. Kowalik
Atty.

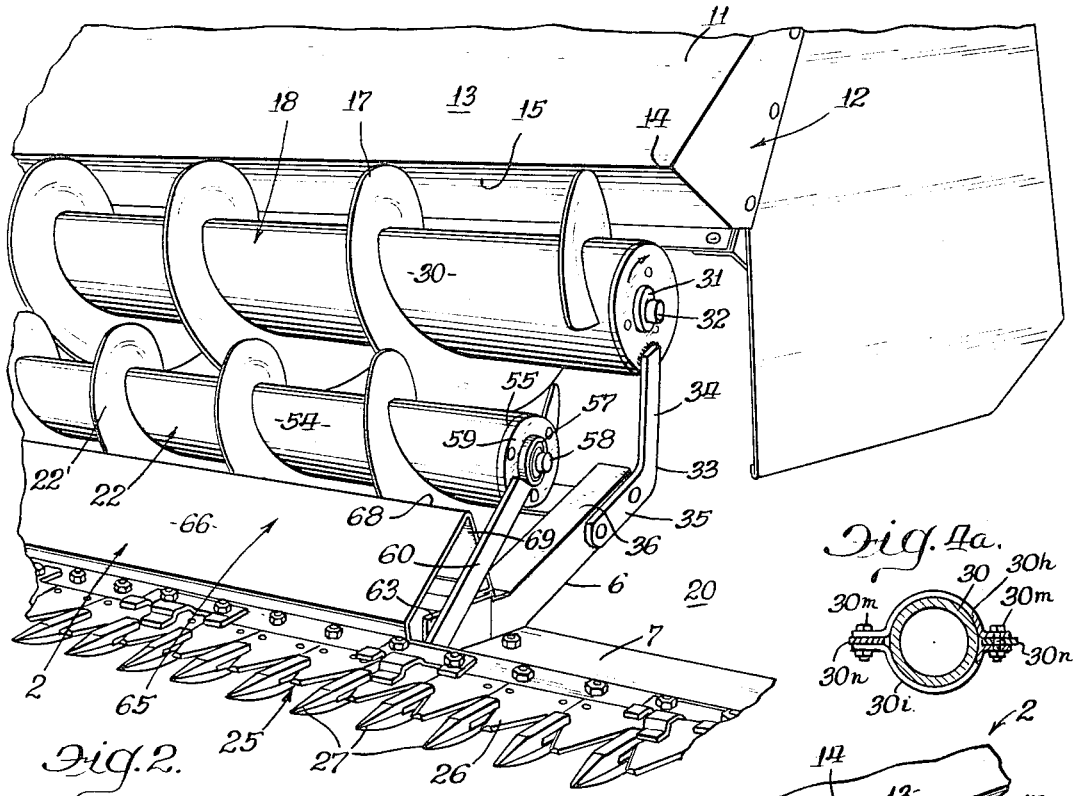
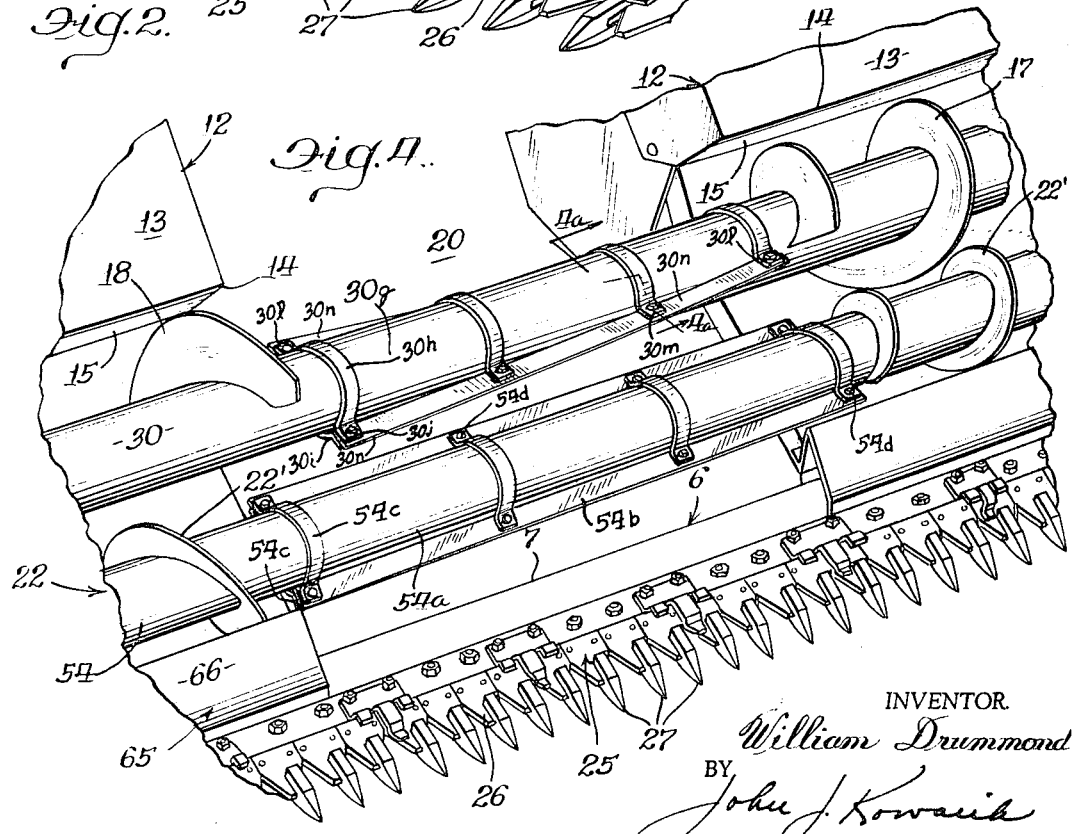

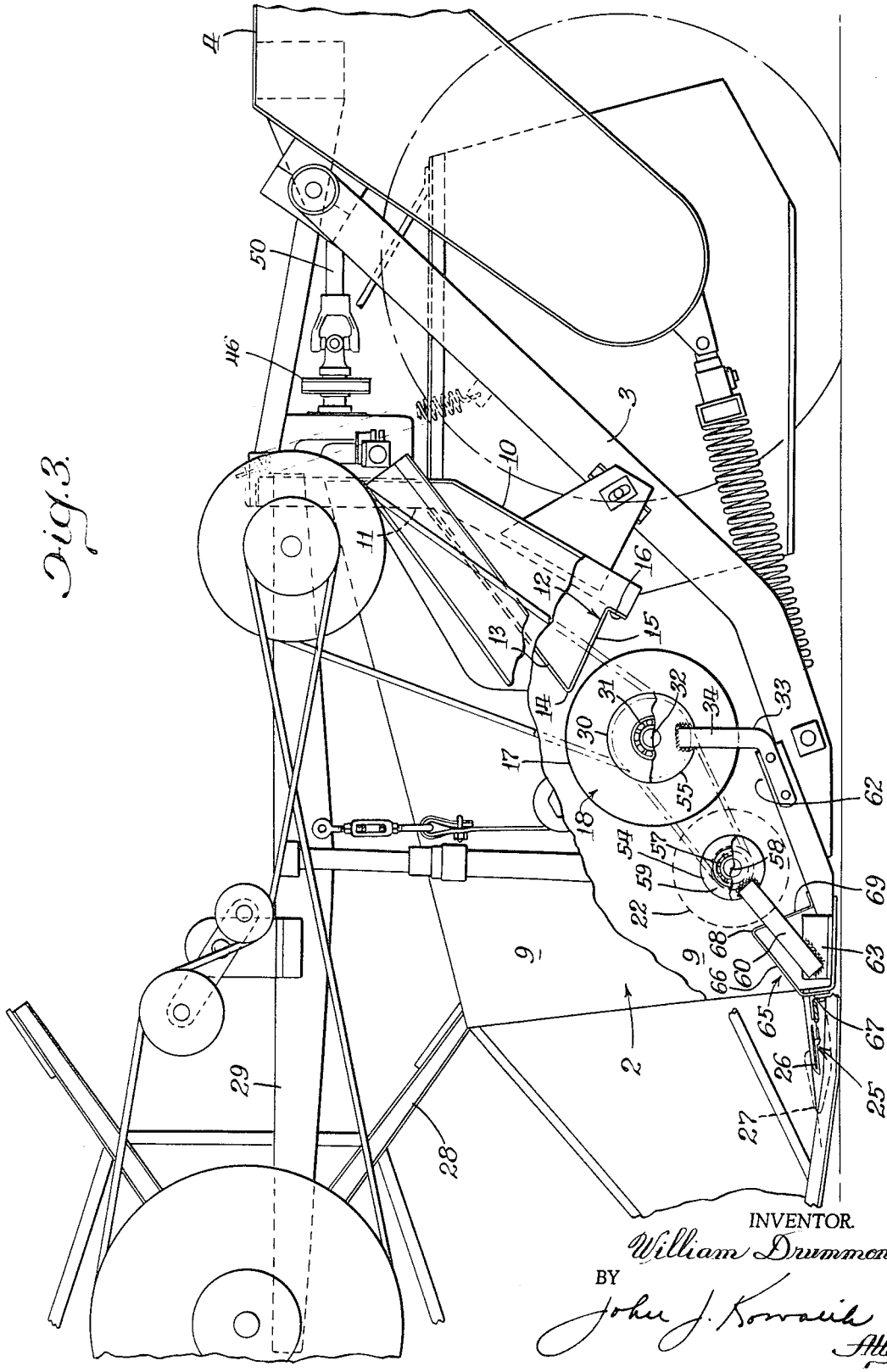

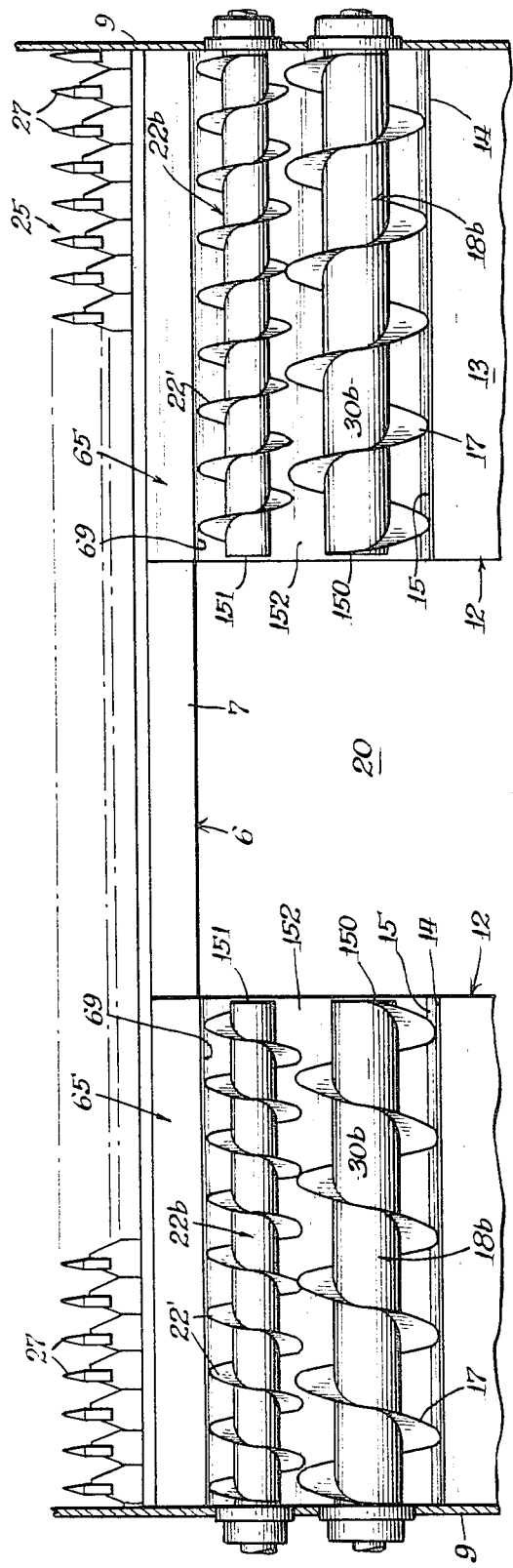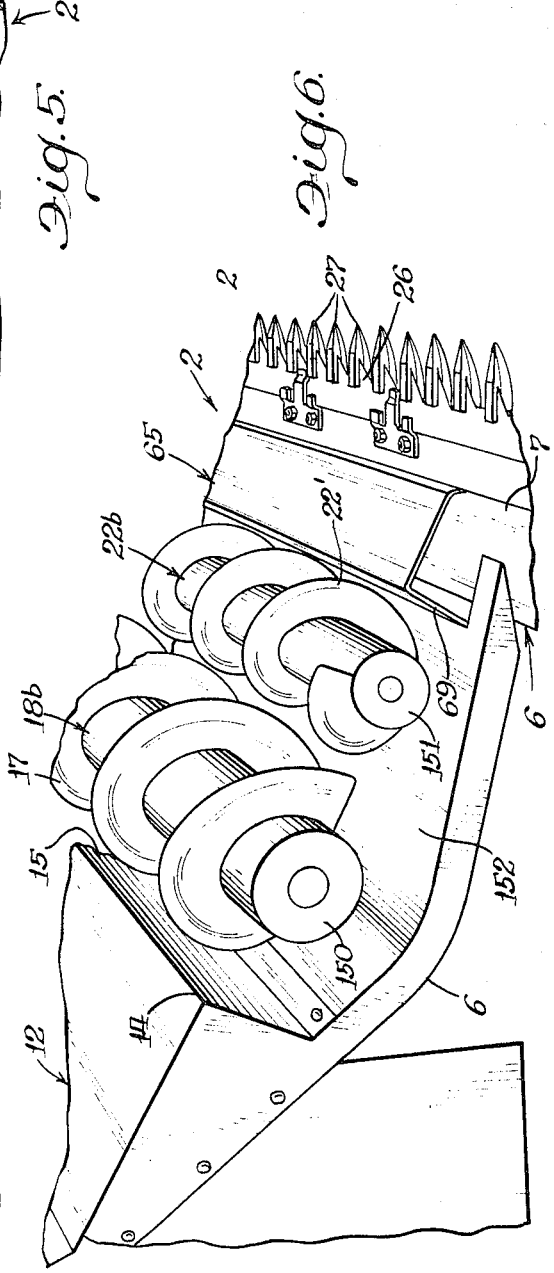

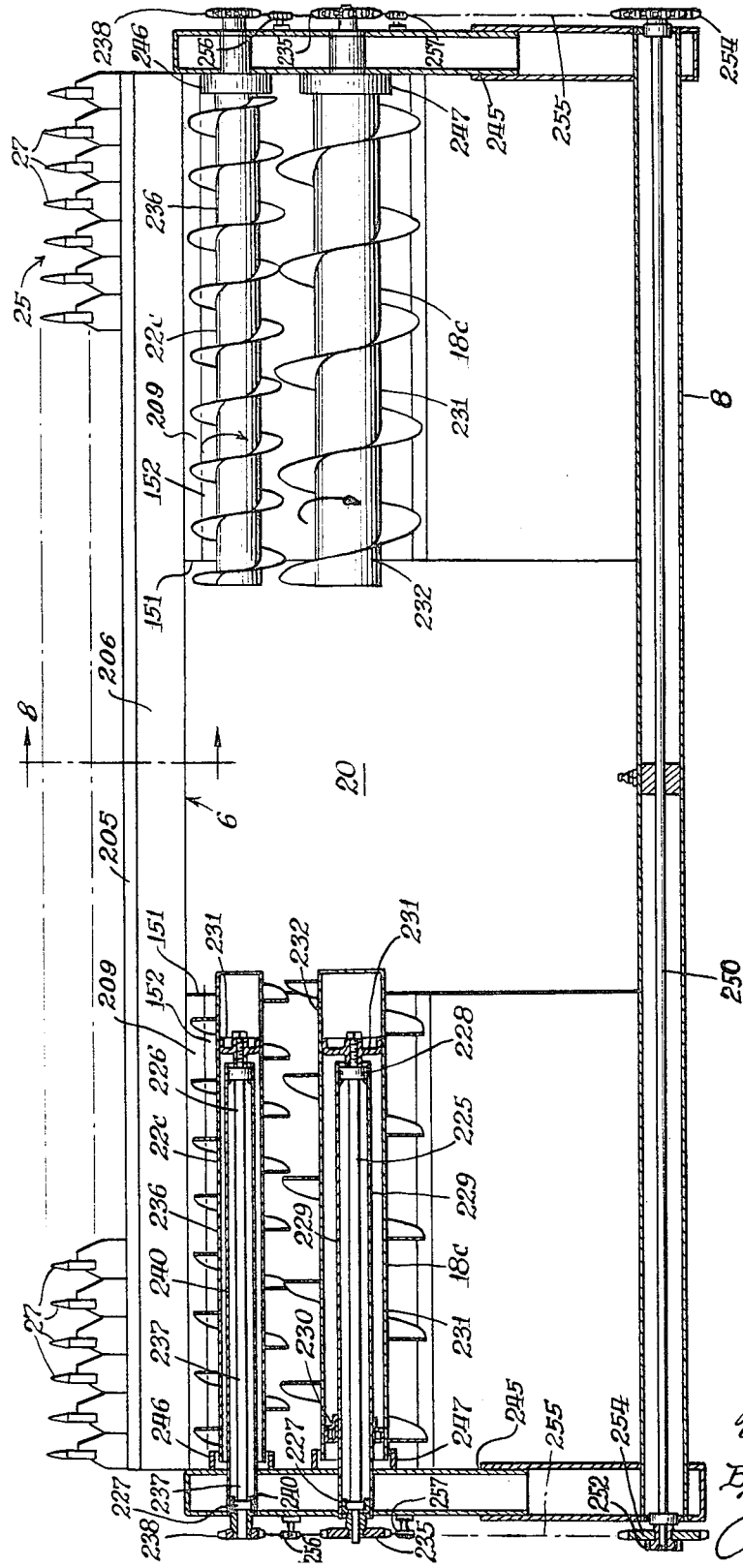

Nov. 26, 1968   W. D. DRUMMOND   3,412,536
AUGER PLATFORM WINDROWER
Original Filed Nov. 24, 1964   6 Sheets-Sheet 6
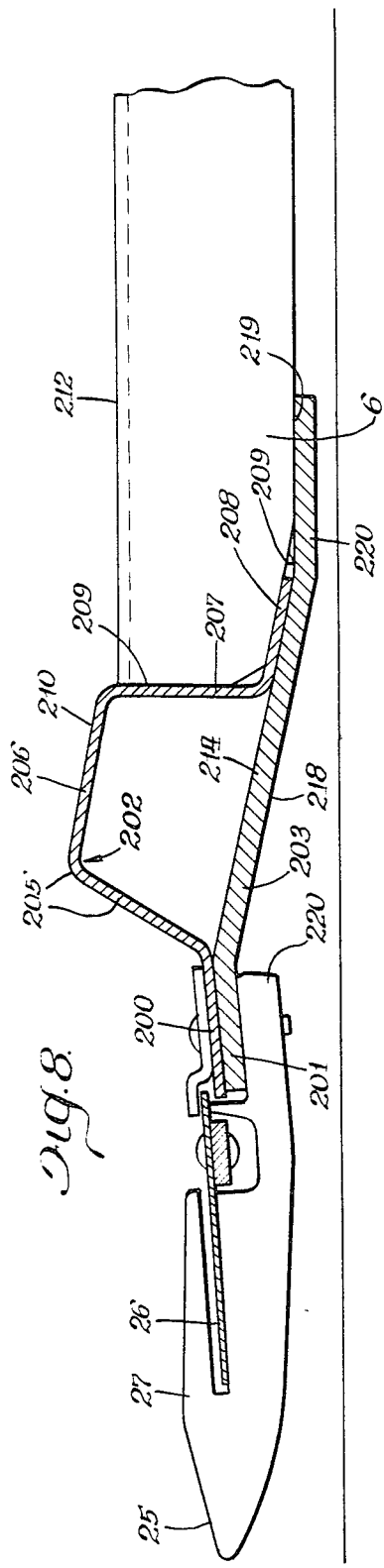
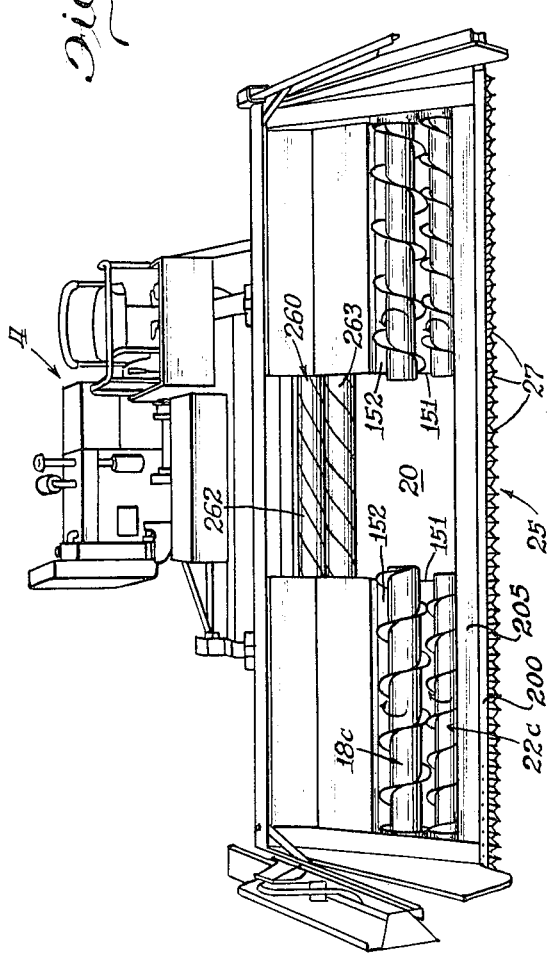
INVENTOR
William D Drummond
By: John J. Kowalik
Atty.

United States Patent Office 3,412,536
Patented Nov. 26, 1968

3,412,536
AUGER PLATFORM WINDROWER
William D. Drummond, Burlington, Ontario, Canada, assignor to International Harvester Company, a corporation of Delaware
Continuation of application Ser. No. 418,942, Nov. 24, 1964, which is a continuation-in-part of application Ser. No. 327,324, Dec. 2, 1963. This application Jan. 23, 1966, Ser. No. 622,845
19 Claims. (Cl. 56—23)

ABSTRACT OF THE DISCLOSURE

A harvester having auger conveyor rotatable to provide a top crop supporting surface to move the crops laterally of an elongated platform.

CROSS REFERENCES

This application is a continuation of my pending application, Ser. No. 418,942, filed Nov. 24, 1964 entitled Double Auger Platform Windrower which is a continuation-in-part of my application Ser. No. 327,324, filed Dec. 2, 1963 both of which are now abandoned.

BACKGROUND OF THE INVENTION

1. Field of the invention

This invention relates to hay harvesting machines and specifically to a novel platform conveying construction for a windrower. Heretofore the only practical conveying means on the platform of a windrower was a draper or canvas type. This type of conveyor comprises an apron made of canvas or any suitable rubberized material which is of the width of the platform and which extends from one end of the platform to the other end and is carried by a pair of rollers, the top surface of the draper conveyor moving toward the windrow opening in the platform. This type of construction had the advantage of being able to adequately handle the crops without allowing the crops to fall through to the ground. However, such a draper or apron type of conveyor has many serious limitations. It is relatively short-lived and secondly it requires constant adjustment and tensioning since the material has a tendency to stretch because it is held taut between two rollers. In addition, it is very costly and quickly wears out or if it develops a rip, the rip quickly progresses across the conveyor and destroys the apron.

2. Description of the prior art

Thus, it has become incumbent to develop a new type of conveyor. In the past, single auger conveyors have been utilized and in general they have failed to move the crop adequately or to properly deposite the crop into a windrow. Furthermore, it has always been a problem to try to maintain the crop from tangling with the bearing mounts for the auger conveyor.

SUMMARY OF THE INVENTION

A general object of the invention is to provide a novel double-auger conveyor for each side of the harvester platform wherein the augers are so arranged that the material is caused to move on top of the augers and the augers collectively function to move the material sidewise into the discharge area of the platform.

A further object of the invention is to provide a novel conveying means for the windrower platform which conveying means comprises two augers extending lengthwise generally parallel to the mower or sickle thereahead, the forward auger being of smaller diameter than the rear auger and the augers having their flights arranged to pass in close proximity to each other.

A more specific object of the invention is to provide in the organization recited a novel double-auger conveyor for a harvester platform wherein the augers rotate with an upward and rearward sweep on their forward and upper sides so as to carry the material thereupon, and thereby prevent wedging the material between the augers and the platform as in previous practices known.

In one embodiment of the invention the augers are shown mounted at their inner and outer ends, the supports at the inner ends of the augers being of novel form to prevent entanglement of the crop material on the bearing supports and thus accommodate free flow of the material into the discharge area.

Another embodiment of the invention illustrates a novel auger which comprises reversed spiral flights at opposite ends and having a plain cylindrical core in between the flights over the discharge area of the platform whereby the auger end portions are mutually sustained through the central flight supporting core, the remote ends of the auger being supported from the sides of the platform.

A further embodiment of the invention illustrates as an attachment the provision of a bottom sheet which is contoured to complement the peripheries of the two augers, said sheet being removable from the platform for certain crop conditions and for other being applicable to the platform to prevent undue losses.

A further object is to provide a novel conveying means on the platform comprising open ended augers.

A further object is to provide a novel windrower with open end angles which have unsupported discharge ends overhanging the discharge opening and wherein the platform and stone guard structure are contoured to obtain an aggressive auger action along the rear edge of the mower and at the same time provide protection for the augers against entry of stones.

These and other objects and advantages inherent in and encompassed by the invention become apparent from the specification and drawings wherein:

DESCRIPTION OF THE DRAWINGS

FIGURE 2 is a fragmentary perspective view of the structure shown in FIGURE 1;

FIGURE 3 is a fragmentary side elevational view partly broken away illustrating the augers from their inner ends;

FIGURE 4 is a fragmentary perspective view of a further embodiment of the invention showing a different form of auger construction;

FIGURE 4a is an enlarged section on line 4a—4a of FIGURE 4;

FIGURE 5 is a plan view partly in horizontal section of another form of the invention;

FIGURE 6 is an enlarged fragmentary perspective view of the structure of FIGURE 5 taken from one end of one pair of augers;

FIGURES 7–9 are directed to another embodiment of the invention;

FIGURE 7 is a plan view partly in horizontal section of the auger arrangement and drive therefor with the hay conditioning rollers omitted;

FIGURE 8 is an enlarged sectional view substantially on line 8—8 of FIGURE 7 with the augers omitted for sake of clarity; and FIGURE 9 is a perspective front view of the entire windrower showing the auger arrangement of FIGURES 8 and 9.

DESCRIPTION OF THE INVENTION

Figure 1:
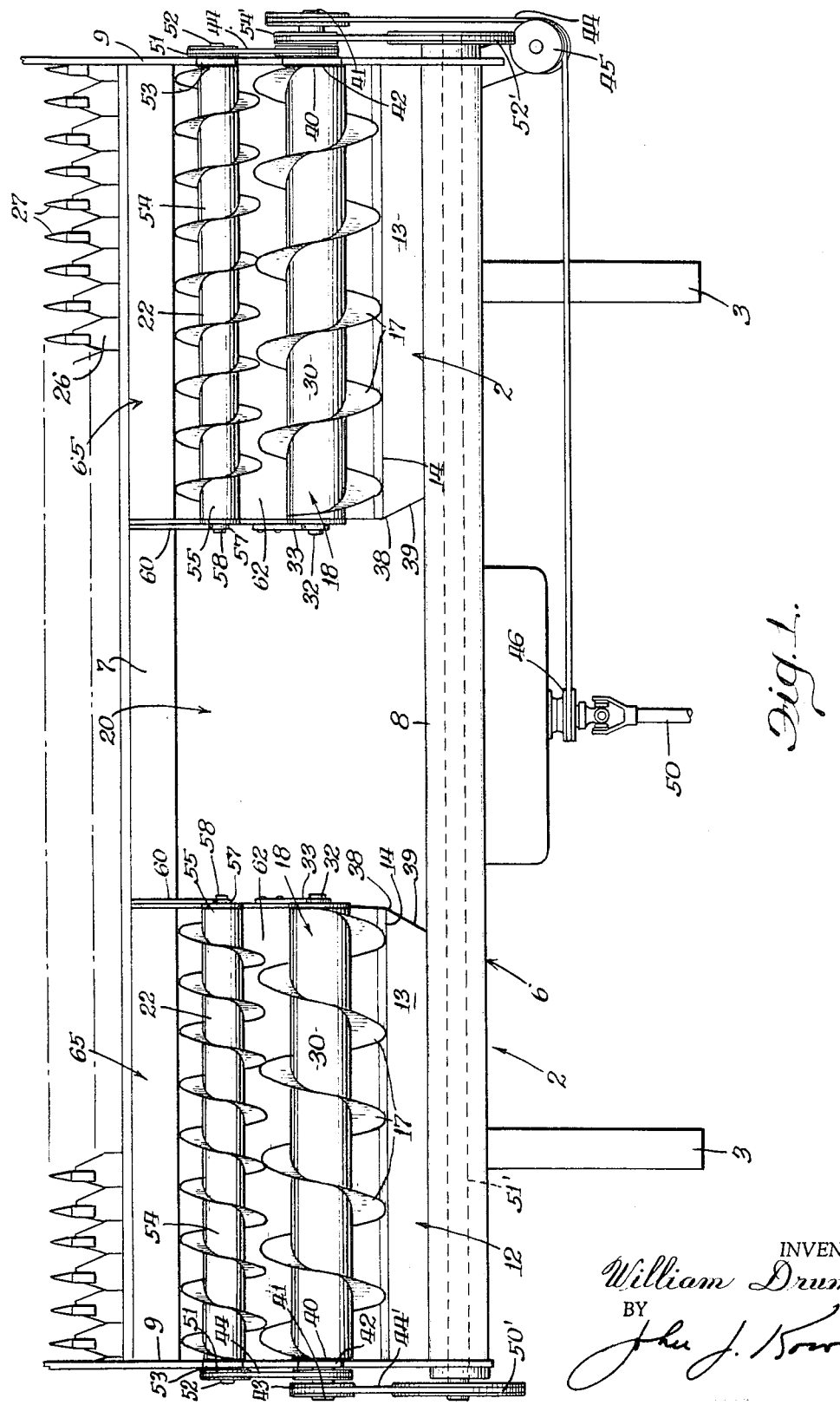
FIGURE 1 is a plan view of one form of the invention as applied to a windrower or harvesting platform.

Describing the invention in detail and having particular reference to the drawings, there is shown a harvester platform generally designated 2 which is carried by a pair of lift arms 3—3 from a self-propelled vehicle, such as a tractor 4. The platform 2 comprises a framework 6 which includes front and rear beam members 7 and 8 which are interconnected at their ends by fore and aft extending upright sidewalls 9—9. The rear frame member 8 is connected to the upper ends of a plurality of dependent braces 10 which carry a rear wall structure 11 and a rear auger stripper 12 which is constituted of an upper downwardly and forwardly inclined ramp or shelf 13 which merges into an apex 14 with a downwardly and rearwardly inclined wiper wall or guide wall 15 which at its lower rear end is fastened as at 16 to the respective members 10 at their lower ends. It will be seen that the apex 14 is disposed in close proximity of the auger flight 17 of the rear auger generally designated 18. It will be understood that in this particular design there are two such strippers 12, one on each side of the discharge opening 20 which is located at the center of the platform. There are two rear augers 18 as well as two forward augers 22 which are parallel with augers 18 and all augers discharge inwardly or centerwardly into the discharge zone 20 of the windrower.

It has been found that by placing the rear augers 18 coaxially and the front augers 22 coaxially and parallel with augers 18 that a novel step up from front to rear is achieved in that front augers in the present design are of substantially 8″ diameter with their flights 22′ whereas the rear augers are of substantially 12″ diameter. The provision of the small auger in front permits placing the augers lower to the ground and at the same time provides a low profile forwardly so that the crops, which are being cut by the sickle or the mower, generally designated 25 which is secured to the front beam 7, may fall naturally onto the front auger without having to climb upwardly. Movement of the crops off the sickle, which is of conventional design incorporating a reciprocating knife 26 operating within the knife guards 27 which are conventionally secured to the forward beam 7, is assisted by the conventional reel 28 mounted from the side walls 9 of the platform by arms 29.

Each rear auger 18 has a center core 30 on which the before-mentioned flight 17 is mounted and the inner end of the core is mounted on a bearing 31 by means of a spindle 32 which is suitably secured to the core 30. The bearing structure 31 is mounted on a support 33 which comprises an upright portion or vertical portion 34, said vertical portion being in vertical alignment with the center of the auger 18 as defined by the spindle 32 and extending downwardly and merging into a forwardly directed leg portion 35 which is secured to a bracket beam 36 which in turn extends downwardly and forwardly and is connected to the forward beam structure 7. The position of the support 33 and particularly of the portion 34 assumes importance in that it is so located that with the auger 18 rotating in the direction as shown by the arrow the crop is not presented to the support but is allowed to escape over the top of the auger whereby plugging is substantially eliminated.

In this connection it will be noted that the apex 14 of each guide scraper structure 12 extends the full length of respective auger 18, however, the inboard edge of this structure is angled rearward and outwardly as indicated at 38 to provide a relief area at 39 so as to permit the crops to fall off the end of the auger without obstruction by the deck structure 13. Thus, the discharge of the crop is facilitated without hampering its movement. The outer end 40 of each auger core 30 is provided with a shaft 41 which is mounted in a bearing 42 carried by the associated upright sidewall 9 of the platform structure. Outwardly of the wall 9, the right auger 18 (FIG. 1) is provided on shaft 41 with a sheave or pulley 43 about which is trained belts 44, said belts being trained about suitable pulleys 45 at the adjacent corner of the platform and the belt proceeding to a pulley 46 which is carried on a support spindle 47 secured to the rear brace or beam member 6 substantially centrally of the platform rearwardly thereof. Pulley 46 is conventionally driven from an input shaft 50 which is suitably connected to a source of power on the tractor, as well known to those skilled in the art. A belt 44′ is trained about a pulley 43′ on shaft 41 and about a pulley 51 on the companion auger 22 to auger 18, said pulley 51 being mounted on the shaft 52 which is carried or journalled in the bearing 53 on the associated sidewall 9 of the platform, the shaft 52 being connected to the core 54 of the forward auger 22. The inboard end 55 of each auger 22 is provided with a bearing structure 57 which is carried from a spindle 58 connected to the end cap 59, said end cap 59 being connected to the front auger support or bracket 60 which in the present instance is a straight strap or bar and it is located in the lower front quadrant of the auger a maximum distance away from the area of initial engagement of the auger with the crops so that if the crop should wind around the auger it will have a chance to drop off through the open bottom 62 and not catch on the support. The forward lower end of the support 60 is connected to an anchor block 63 which is suitably secured to the front beam structure 7 beneath the shield or front deck structure designated 65. The deck structure 65 includes an uppper, forwardly and downwardly inclined deck wall 66 which at its lower forward end 67 terminates immediately behind the cutter 25 and the upper end terminates in an apex 68 which is disposed slightly below the centerline of the center of the front auger 22. The wall 66 merges with the upper end of a rear wall 69 which is angled rearwardly and downwardly and at its lower end is connected to suitable braces which extend between the rear wall structure of the platform and the forward beam member 7 and are suitably connected thereto.

Thus, it will be seen that at each side of the auger platform there are provided front and rear augers and that the front auger is substantially smaller than the rear auger and that a step-up design is achieved. Furthermore, it will be realized that the augers discharge laterally inwardly of the platform into the discharge area or opening 20 which is in the present instance disposed at the center of the platform. It will be seen that the leftward augers 22, 18 are mounted in identical manner as the rightward augers and that thereto drive is by a belt 43′ trained about pulley 43 which is trained about a pulley 50′ on shaft 51′ which is journalled in beam 8 and extends to the rightward side thereof whereat it is connected to a pulley 52′ driven by belt 53′ which is trained about pulley 54′ connected to shaft 41 of the right-hand auger 18. Of course, it will be realized that the form of drive is of itself immaterial and what is important is the mounting of the augers particularly at their inner ends in order to allow for free flow of crops without entanglement about the supports and in the arrangement of the augers with respect to one another and with respect to the sickle in order to move the crops adequately.

Referring now to the embodiment of the invention shown in FIGURE 4, it will be seen that the same construction and arrangement of the augers as in the previous embodiment, is utilized. In the present structure the inner bearing supports for the augers is eliminated and the core 54 of the front auger is provided with an extension 54a which interconnects the two auger end portions so that the center support is eliminated. Similarly, the rear auger is provided at a core extension 30g. The inner bearings are eliminated and the auger end portions of the front and rear augers are both supported from the end walls.

The core portion 30g is embraced by and between clamp halves 30h, 30i at spaced intervals and these halves have outturned flanges 30j, 30k which are apertured and admit nut and bolt assemblies 30f therethrough which also pass through suitable apertures 30m in the flights or paddles 30n which extend axially of the core section 30g. The flights 30n are spiralled about core 30g and the lead of the spiral is adjustable merely by loosening the respective clamps and suitably twisting the flights 30n about the core whereupon the flights 30n are secured in desired place by tightening the clamps. Similarly the front core 54a is provided with adjustable flights 54b secured by clamps 54c with bolt and nut assemblies 54d.

Thus in various crop conditions the lead of the front and rear flights may be varied to obtain an optimum discharge and windrow formation.

A further embodiment of the invention is shown in FIGURES 5 and 6 wherein parts which correspond to those in the previous embodiments are identified with corresponding numbers. In this particular embodiment it will be realized that the front and rear augers are open ended at their inner ends 150 and 151. In other words, they are not supported at their inner ends, only at their outer ends. In this particular embodiment, the inner ends 150 and 151 of the augers 18b and 22b are free and terminate substantially even with the trough portion 152 therebeneath, said trough portion or deck of the platform extending between the rear wall 69 of the forward guide and deck portion and the forward wall 15 of the rear deck and guide portion, and thereby enclosing the bottom of the deck between the opening at the center of the platform and the respective outward walls. The relationship of the augers in their sizes in their direction of rotation, the top side of the augers rotate from front to rear, is the same as in the previous embodiments except that the augers in the present instance are suitably supported by sufficient bearings which are on the outer walls.

It will be noted that the rear auger 18b in the present instance has a 12-inch overall diameter with a 6-inch diameter core or tube 30b and that the front auger 22b has an 8-inch overall diameter on a 5-inch core or tube 54. The pitch of the flight 17 on the rear auger is 12 inches and the pitch of the flight of the front auger is 8 inches. The speeds of the augers are inversely proportional to their overall diameters.

Referring now to the embodiments of the invention shown in FIGURES 7 through 9 it will be noted that parts common to those of the previous embodiment are identified with the same reference numerals. In the present embodiment the mower 25 is connected to the forward flange portions 200 and 201 of the upper and lower stone guards 202 and 203. It will be realized that these stone guards 202 and 203 in effect form the forward edge of the platform 6. The upper stone guard 202 comprises a forwardly facing ramp or wall 205 which slopes upwardly and rearwardly at an abrupt angle over 90° to about 120° with respect to the plane of the flange portion 200, said wall 205 projecting above the level of the mower and serving to deflect stones which may be combed by the guard fingers 25 over the mower. These stones eventually drift off laterally. The upper end of the wall or ramp 205 merges into the forward edge of the rearwardly and downwardly extending upper guide wall 206 which in turn merges with the downward extending rear wall 207, wall 207 continuing into a rearwardly extending flange 208. The wall 207 forms the barrier along the front edge 209 of the platform 6 and is connected thereto and the flange 208 is underposed with respect to the lower edge 209 of the platform and is suitably connected thereto as by welding, bolting or otherwise. It will be seen that the upper side surface 210 of the guide wall 206 gently merges into the top surface 212 of the platform 6 so as not to provide any obstruction to the flow of cut material. The lower stone guard 203 has a downwardly and rearwardly extending portion 214 which with the portions 205, 206, and 209 forms a box section and covers the space beneath these walls and provides a diagonal upwardly and forwardly facing surface 218 which extends from above the rear anchor portion 220 of the mower guards downwardly therebelow and that its rear edge is continued as a flange 220 which is underposed with respect to the portion 208 and the lower edge 219 of the platform 6 and is connected thereto. The slope of the surface 218 permits the platform to readily slide over the ground and particularly mud.

As will be readily apparent in this embodiment, the structure is similar to that shown in FIGURES 5 and 6 with several significant improvements, namely, the augers 18c and 22c which correspond to augers 18b, 22d extend beyond the opposed edges 151 of the platform walls 152, 152 the extent being approximately 4 inches over the discharge opening 20. The supported ends of the augers as in the previous embodiment are carried by inner shafts 225 and 226. These shafts are journalled respectively on bearings 227, 228 mounted within an inner tube 229, the tube supporting an internal support 230 for the core 231 of the tube of the auger 18c and the shaft 225 supporting the annular insert 231 which is connected to the free end 232 of the core 231. The shaft 225 is connected to a sprocket 235 which corresponds to the pulley 51, 43 or to the pulley 51. Similarly, the auger core 236 of the auger 22c is supported from an internal shaft 237 which is connected to the pulley 238. The drive proceeds as with the belts heretofore described except that the chains are used and trained about the sprockets. The augers are caused to rotate in appropriate direction in order to cause the flighting thereof to move or advance the material toward the center of the windrower. It will be seen that the supported ends 240 and 241 of the augers are encased within housing structures 245 and the core portions are telescoped within shrouds 246, 247 to prevent hair pinning the material between the auger cores or the supporting shafts and the respective end walls of the housing.

In the present embodiment the front augers are almost completely exposed on their forward sides to increase their aggressiveness. The material is moved upwardly, the rotors rotating in the direction of the arrows.

The drive for the augers proceeds from the countershaft 250 which has an input gear 252 connected to one end. Gear 252 is geared to a suitable power source on the tractor 4.

Each end of shaft 250 has a sprocket 254 which drives a chain 255 suitably trained about the respective sprockets 235 and 238 and idlers 256 and 257 mounted on the associated side of the platform. The augers are driven in a direction as shown by the arrows.

The discharge opening 20 is in front of the hay conditioning apparatus 260 which is supported from the ambulatory structure 4. Apparatus 260 includes a pair of rollers 262, 263 which pass the hay therebetween and deposit the same rearwardly thereof as known to those skilled in the art.

Having described several preferred forms of the invention, it will be realized that various other designs and variations will become readily apparent to those skilled in the art within the scope of the appended claims.

What is claimed is:

1. In a crop harvester having a laterally elongated platform with a crop discharge area, conveying means carried from the platform behind the forward edges thereof for condensing the material gathered along the entire length of the platform and delivering the crop into said discharge area, said conveying means comprising a set of front and rear augers extending lengthwise of the platform, said front auger being of lesser diameter than the rear auger, and means for rotating both augers, said augers supporting the crop and discharging it laterally.

2. The invention according to claim 1 and combination deck and stripper means on the platform disposed respectively ahead of the front auger and behind the rear auger for restraining the entry of material to the undersides of the augers.

3. The invention according to claim 1 and said augers extending generally parallel to each other and having flights passing in close proximity to each other and means supporting opposite ends of said augers.

4. The invention according to claim 1 and said augers extending generally parallel to each other and having flights passing in close proximity to each other and means supporting opposite ends of said augers and comprising brackets including supports at said discharge area, the support for the rear auger comprising a vertical portion substantially in vertical alignment with the axis of rotation of the rear auger and the support for the front auger comprising a portion extending downwardly and forwardly from the axis of the front auger out of the path of material discharging therefrom.

5. In a windrower, a platform having a front edge and a crop discharge opening intermediate its ends, fore and aft extending sidewalls at said ends, a pair of augers, one behind the other, mounted on each sidewall and extending therefrom to said opening generally parallel to said forward edge, one of said augers disposed alongside said edge and the other auger behind the one auger and having a larger diameter than the one auger, said augers having flights passing in close proximity to one another, and said augers having cores, and the core of the other auger being substantially larger than the core of the one auger, and said one auger behind disposed at a lower elevation than the other auger, and both augers rotating in the same direction and supporting the crop and discharging it laterally.

6. In a windrower, the combination of a transversely elongated platform having front and rear edges and a crop discharge area, conveying means on the platform for moving crops lengthwise of the platform and comprising a pair of generally parallel augers mounted for rotation on axes transverse to the direction of movement of the platform, one of said augers being of smaller diameter than the other and disposed adjacent to said front edge and the other auger being adjacent to the rear edge and each auger having flights spiraled in the same direction.

7. The invention according to claim 6 and at least one of said augers having a portion at said discharge area, and flight means secured to said portion and selectively positionable thereon with different leads.

8. The invention according to claim 6 and said other auger having a diameter one-third larger than said one auger.

9. A harvester platform of the type having a forward crop receiving edge and a crop discharge area less than the length of said edge, auger conveyor means mounted on the platform along said edge and having discharge ends adjacent to said discharge area, said platform having a crop stripper means thereon adjacent to the conveyor means in stripping relation thereto, and said stripper means having an end portion substantially coterminous with the end of the conveyor means, and a cutout in said end portion behind the auger means receding rearwardly toward the other end of said conveyor means and exposing the delivery end of said auger means to facilitate discharge of crops from the auger means to the discharge area.

10. In a windrower having a platform with a central discharge area, and a pair of augers at each end of the platform having discharge extremities at the discharge area, respective augers being coaxially disposed lengthwise of the platform, and said augers of each pair being of different diameters, and said augers having core portions extending across said discharge area and flights on said portions rotatable about said core portions to vary the pitch thereof.

11. The invention according to claim 10 and means for holding said flights in various adjusted positions thereof.

12. The invention according to claim 10 and means for holding said flights in various adjusted positions thereof and comprising clamps connected to said flights and embracing said cores under hoop tension.

13. In a windrower having a platform with a central discharge area, and a pair of augers at each end of the platform having discharge extremities at the discharge area, respective augers being coaxially disposed lengthwise of the platform, and said augers of each pair being of different diameters, and said augers having cores and circumferentially adjustable flights mounted on the cores.

14. The invention according to claim 1 and said augers having end portions projecting over the adjacent edges of said discharge area for delivering crop material beyond said edge.

15. In a windrow harvester having a platform elongated transversely to the direction of travel, said platform having end walls defining opposite ends of the platform, said platform having bottom wall sections spaced lengthwise of the platform and defining therebetween a crop discharge opening intermediate the ends of the platform, a plurality of auger means on the platform superposed with respect to the platform and supported solely on respective end walls and extending generally parallel to the longitudinal axis of the platform, said auger means having end portions extending a substantial distance over the respective edges of the respective sections defining opposite edges of said crop discharge opening.

16. The invention according to claim 15 wherein said auger means comprises a plurality of augers at each side of the opening of progressively increasing diameter and said auger means having upper crop guiding and supporting surfaces, said augers presenting an upwardly and rearwardly inclined profile.

17. In a windrower having a platform elongated transversely to the direction of traverse, said platform having a bottom including longitudinally spaced sections defining a crop discharge opening between adjacent edges of said sections, auger means superposed with respect to the platform, said auger means comprising at least one auger supported from each end wall and the auger having an end portion extending and projecting over and beyond the adjacent edge of the respective section in vertical alignment with the opening, stone guard means extending along the forward edge of each section between said edge of the section and the respective end wall, said stone guard having a forward ramp surface projecting upwardly and having a top surface sloping downwardly and rearwardly, and crop cutting means extending along the entire forward edge of said platform and across said crop discharge opening.

18. In a crop harvester having a laterally elongated platform with a crop discharge area, conveying means carried with the platform behind the forward edge thereof for condensing the material gathered along the length of the platform and delivering the crop into said discharge area, said conveying means comprising auger means extending lengthwise of the platform, said auger means presenting an upper crop conveying and supporting surface for supporting the crop as it is laid upon the auger means and discharging the crop laterally, and stripper means superposed with respect to said auger means and including a wall providing an upper crop supporting surface sloping downwardly toward said auger means.

19. The invention according to claim 18 wherein said stripper means is triangular shaped in side elevation and comprises a lower wall converging with said wall providing an upper crop supporting surface and forming an apex therewith overlying said auger means.

References Cited

UNITED STATES PATENTS

| | | | |
|---|---|---|---|
| 45,597 | 12/1864 | Fox et al. | 56—158 |
| 3,060,665 | 10/1962 | Escher | 56—21 |
| 3,118,265 | 1/1964 | Shaver | 56—23 |

ANTONIO F. GUIDA, *Primary Examiner.*